United States Patent [19]
Graff

[11] 4,081,177
[45] Mar. 28, 1978

[54] BREAK-AWAY OUTRIGGER

[75] Inventor: Albert J. Graff, Arlington, Mass.

[73] Assignee: The United States of America as represented by the Secretary of the Air Force, Washington, D.C.

[21] Appl. No.: 776,386

[22] Filed: Mar. 10, 1977

[51] Int. Cl.² .......................................... E04H 17/00
[52] U.S. Cl. ...................................... 256/12; 403/2; 403/229; 340/282
[58] Field of Search ........................... 256/11, 12, 1; 200/61.52; 340/261, 282; 403/2, 229; 404/10

[56] References Cited

U.S. PATENT DOCUMENTS

| | | | |
|---|---|---|---|
| 1,440,852 | 1/1923 | Thomson | 256/11 |
| 2,345,771 | 4/1944 | Reynolds | 340/261 |
| 3,084,913 | 4/1963 | Cox | 256/11 |
| 3,437,059 | 4/1969 | Stonier et al. | 403/229 X |
| 3,438,311 | 4/1969 | Remek | 404/10 |
| 3,771,767 | 11/1973 | Dougherty | 256/12 X |
| 3,846,030 | 11/1974 | Katt | 403/2 |
| 3,861,084 | 1/1975 | Ford | 256/12 X |
| 3,912,404 | 10/1975 | Katt | 403/2 |
| 4,005,397 | 1/1977 | Blair | 256/1 X |

Primary Examiner—Andrew V. Kundrat
Attorney, Agent, or Firm—Joseph E. Rusz; Arsen Tashjian

[57] ABSTRACT

An outrigger arm assembly to prevent a would-be intruder from successfully climbing over a fence. The outrigger arm assembly is mounted on top of the fence. Each hollow fence post is interconnected to a hollow outrigger arm by a replaceable collar which breaks when a load in the range of 20 to 30 pounds is applied to the outrigger arm, resulting in the downward movement of the outrigger arm, and the fall of the climber. The assembly also includes a movement sensor, within the hollow arm, which is activated and provides an alarm signal, when the outrigger arm is moved more than a predetermined number of degrees, such as the downward movement of the outrigger arm. The assembly further includes a coiled spring, positioned within the hollow fence post and extending into the hollow outrigger arm, by which the arm is automatically returned to its original defensive position, after the load is removed.

4 Claims, 1 Drawing Figure

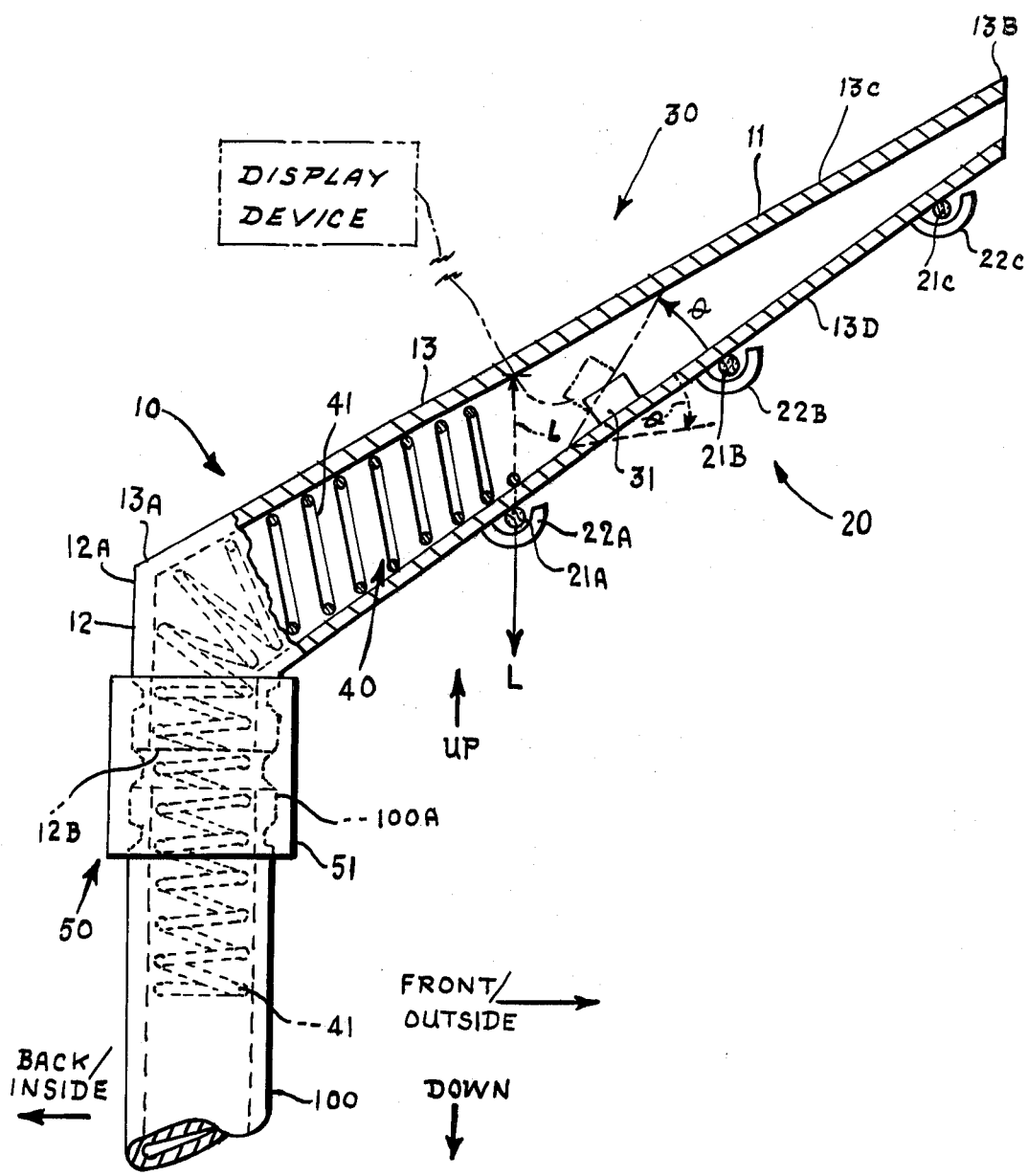

BREAK-AWAY OUTRIGGER

STATEMENT OF GOVERNMENT INTEREST

The invention described herein may be manufactured and used by or for the Government for governmental purposes without the payment of any royalty thereon.

BACKGROUND OF THE INVENTION

This invention relates to fences and, more particularly, to an outrigger arm assembly adapted for use with hollow upright fence posts.

It is well-known in the fence art, as well as in the security field, that an extension (i.e., outrigger arms) mounted on top of, and angularly inclined and outward from, fence structures constitutes a psychological obstacle, rather than a real physical obstacle, to a would-be intruder who is intent on climbing the fence upon which the extension is mounted. This is so, even if the fence is chain-link fabric (or barbed wire), and if the extension is stranded transversely by and with barbed wire, and also if the fence is eight feet or more in height (i.e., a height which necessitates that a would-be intruder must be off the ground before he reaches the outrigger arms). In fact, it is equally well-known that the outrigger is actually used by skilled climbers as a tool to climb over the fence.

Therefore, what is needed in the art, and is not presently available, is structural means to enhance the effectiveness of an outrigger in deterring a determined fence climber.

I have invented such a structural means (which I refer to herein as a "break-away outrigger" or as "an outrigger arm assembly"); and, thereby, I have significantly advanced the state-of-the-art.

SUMMARY OF THE INVENTION

My invention, as adapted for use with a fence structure, is a break-away outrigger, i.e., an outrigger arm assembly which will break away from the fence structure when a load of preselected quantity is applied (e.g., the pulling action of a climber holding on the outrigger arm and/or the transversely positioned barbed wire connected thereto), whereby the climber, most probably, will fall off the outrigger and/or the fence, or at the very least will become entangled in the barbed wire of the outrigger.

Accordingly, the principal object of this invention is to teach the structure of such a unique break-away outrigger (i.e., outrigger arm assembly).

Another object of this invention is to provide means for the self-return of the outrigger defensive position or posture (i.e., angularly inclined and outward from the fence), after the outrigger has broken away from the fence and the load is removed from the broken-away outrigger.

Still another object of this invention is to provide means for sensing movement of the break-away outrigger, whether the outrigger is broken away or not, whereby an alarm will result from the movement, and thereby alerting others, such as security personnel, of the movement and of the attempt of the climber to scale the outrigger.

These objects, as well as other related objects, of this invention will become readily apparent after a consideration of the description of my invention, together with reference to the contents of the drawing.

DESCRIPTION OF THE DRAWING

The drawing is a side elevation view, partially schematic, partially pictorial, partially fragmented, partially in phantom, and in simplified form, of a preferred embodiment of the adaptation of my inventive break-away outrigger (i.e., outrigger arm assembly).

DESCRIPTION OF THE PREFERRED EMBODIMENT

With reference to the drawing, shown therein in simplified form, is a side elevation view of a preferred embodiment 10 of my inventive outrigger arm assembly. To better orient and assist the reader the directional designations "front-outside," "back-inside," "up" and "down" are shown, together with their respective arrows.

As shown in the drawing, the preferred embodiment 10 comprises: a hollow outrigger arm 11 in the form of an upright portion 12 and an inclined portion 13, wherein the upright portion 12 has a top end 12A and a bottom end 12B, and the inclined portion 13 has a first end 13A second end 13B, an upper external surface 13C, and a lower external surface 13D; means, generally designated 20, connected to the lower external surface 13D of the inclined portion 13 of the hollow outrigger arm 11, for holding and supporting a plurality of wires (preferably barbed wires), such as representative wires 21A, 21B and 21C, that are strung transverse to the inclined portion 13; means, generally designated 30, associated with the inclined portion 13 of the hollow outrigger arm 11, for sensing movement of this inclined portion 13; means, generally designated 40, associated with hollow upright fence post 100 and with the hollow outrigger arm 11, for maintaining the hollow outrigger arm in a preselected positional relationship with and to the hollow upright fence post (i.e., angularly inclined and outward from and to the front of the fence post 100); and, means, generally designated 50, for releasably holding together and supporting the top end portion 100A of the hollow upright post 100 and the bottom end 12B of the upright portion 12 of the hollow outrigger arm.

The wires holding and supporting means 20 may comprise, and preferably does, a plurality of hooks, one hook for each wire, such as representative hooks 22A (for wire 21A), 22B (for wire 21B) and 22C (for wire 21C). The hooks 22A, 22B and 22C are connected, in spaced-apart relationship, to the lower external surface 13D of the inclined portion 13 of the hollow outrigger arm.

The movement sensing means 30 comprises, and preferably is, either one of two types of commercially readily available movement sensors, either electric or electronic. The sensor, such as 31, is positioned within the inclined portion 13 of the hollow outrigger arm 11, and is so disposed that it is activated when the inclined portion 13 is moved a predetermined number of degrees, $\theta$, from the normal (i.e., usual) angular inclination of the inclined portion 13. One type of such a commercially available movement sensor will ring a loud, sound alarm, thereby alerting security personnel and others. Another type of commercially available sensor is linkable to a display device, with or without connecting wires, which can be positioned at a central security or surveillance facility, and when this type of movement sensor is activated, a sight (video) and/or sound (audio) alarm signal is provided at the display device.

The hollow outrigger arm-hollow upright fence preselected positional relationship maintaining means 40 may comprise, and preferably is, a coiled spring 41 disposed within the hollow outrigger arm 11 and within the top end portion 100A of the hollow upright fence post 100.

The releasable holding (together) and supporting means 50 for the top end portion 100A of the hollow upright fence post 100 and the upright portion 12 of the hollow outrigger arm 11 may comprise, and preferably is, a collar 51 that is fitted over and holds together the top end portion 100A of the hollow upright fence post 100 and the upright portion 12 of the hollow outrigger arm 11. The collar 51 is made of material that breaks when a load, such as "L," a preselected quantity (preferably in the range of 20 to 30 pounds) is applied to the inclined portion 13 of the hollow outrigger arm 11 (or to any of the transversely stranded wires 21A or 21B or 21C). It is here to be noted that this easily breakable collar 51 is equally easily replaceable.

MANNER OF OPERATION OF THE PREFERRED EMBODIMENT

The manner of operation of the preferred embodiment 10 of my inventive break-away outrigger (i.e., outrigger arm assembly) can be ascertained very easily by a person of ordinary skill in the art from the foregoing description, together with reference to the contents of the drawing.

For others, it is sufficient to say in explanation, that what occurs, in sequence, is as follows: A climber-intruder climbs the fence having a plurality of fence posts, such as 100, and mounted upon the fence, a plurality of my outrigger arm assemblies, such as 10, one for each fence post; and, at some time during the climb, the would-be intruder must reach one of my outrigger arm assemblies 10. When he grabs the inclined portion 13 of the arm 11 and/or the wires 21A, 21B or 21C, the collar 51 breaks, and he is unable to climb over the outrigger. In addition, when the collar 51 breaks, and the arm 11 is pivoted, or is otherwise moved downwardly, the movement sensor 31 is activated and gives off the alarm. After the climber lets go of the inclined portin 13 and/or of the wires 21A, 21B or 21C, the coiled spring 41 returns the outrigger to the defensive posture (i.e., the original position, as shown in the drawing). The broken collar 51 may be easily replaced thereafter.

CONCLUSION

It is abundantly clear from all of the foregoing, and from the contents of the drawing, that the stated and desired principal object, as well as the other objects, of my invention, have been attained.

It is to be noted that, although there have been described the fundamental and unique features of our invention as applied to a particular preferred embodiment, various other embodiments, adaptations, substitutions, additions, omissions, and the like may occur to, and can be made by, those of ordinary skill in the art, without departing from the spirit of my invention.

What is claimed is:

1. An outrigger arm assembly adapted for use with a hollow upright fence post having a top end portion with a top end, comprising:
   a. hollow outrigger arm configured in the form of an upright portion and an inclined portion, wherein said upright portion has a top end and a bottom end and said inclined portion has a first end, a second end, an upper external surface and a lower external surface;
   b. means, connected to said lower external surface of said inclined portion of said hollow outrigger arm, for holding and supporting a plurality of wires transverse to said inclined portion wherein said means includes a plurality of hooks connected, in spaced-apart relationship, to said lower external surface of said inclined portion of said hollow outrigger arm;
   c. means, in abutting contact with said inclined portion of said hollow outrigger arm, for sensing movement of said inclined portion, wherein said means for sensing movement of said inclined portion comprises a sensor positioned within said inclined portion, with said sensor so disposed that it is activated when said inclined portion is moved a predetermined number of degrees from the normal inclination of said inclined portion;
   d. means, disposed internal of said hollow upright fence post and said hollow outrigger arm, for maintaining said hollow outrigger arm in a preselected positional relationship with and to said hollow upright fence post;
   e. and, means for releasably holding together and supporting said top end portion of said hollow upright fence post and said bottom end of said upright portion of said hollow outrigger arm.

2. An outrigger arm assembly, as set forth in claim 1, wherein said means for maintaining said hollow outrigger arm in a preselected positional relationship with and to said hollow upright fence post is a coiled spring disposed within said hollow outriggerarm and said top end portion of said hollow upright fence post.

3. An outrigger arm assembly, as set forth in claim 1, wherein said means for releasably holding together and supporting said top end portion of said hollow upright fence post and said upright portion of said hollow outrigger arm is a collar that is fitted over and holds together said top end portion of said hollow upright fence post and said upright portion of said hollow outrigger arm, wherein said collar is made of material that breaks when a load of preselected quantity is applied to said inclined portion of said hollow outrigger arm.

4. An outrigger arm assembly, as set forth in claim 3, wherein the load of preselected quantity is in the range of twenty to thirty pounds.

* * * * *